UNITED STATES PATENT OFFICE.

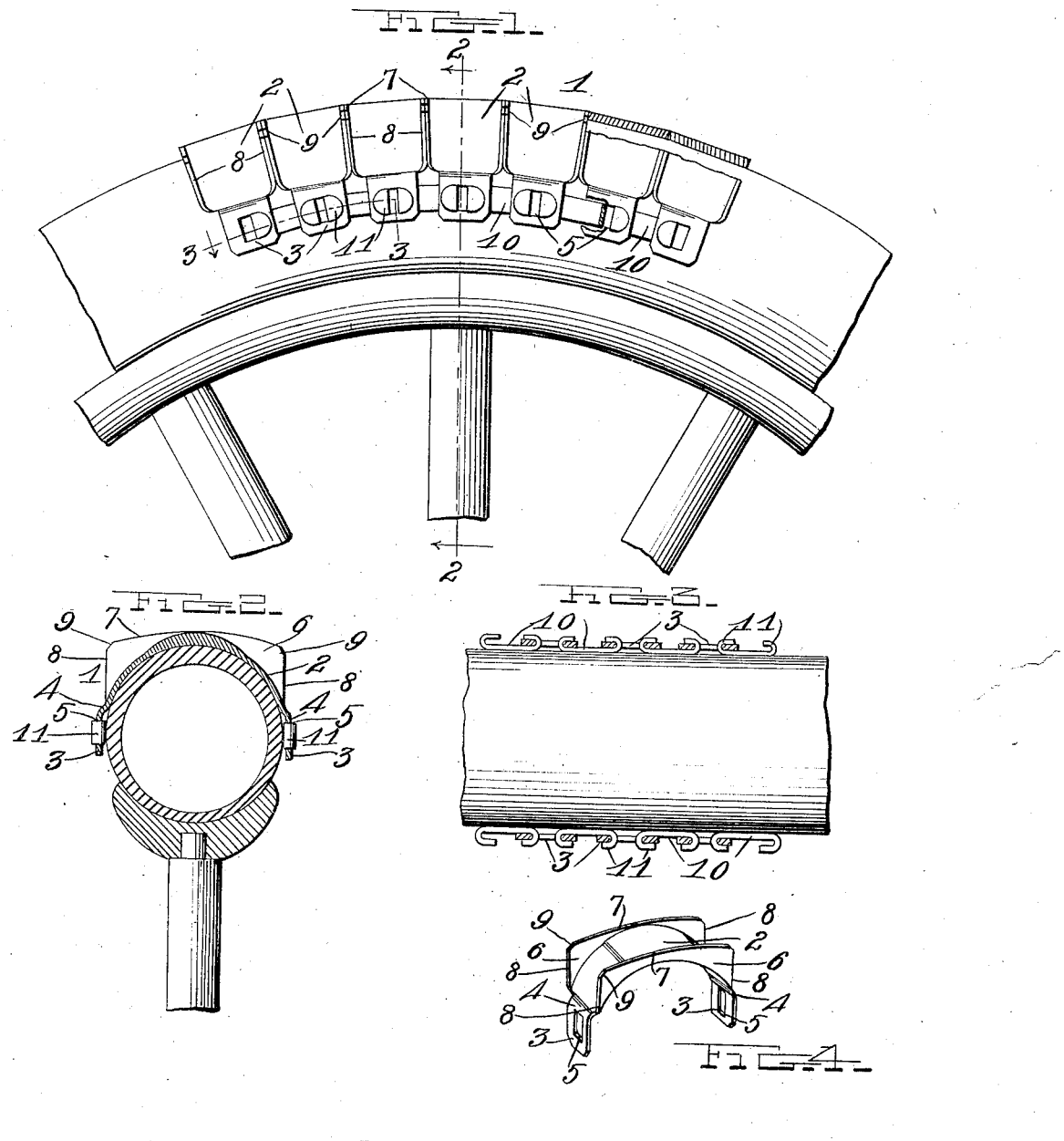

DAVID NEWTON JONES, OF GAYLORD, MINNESOTA.

TIRE-PROTECTOR.

1,007,874.　　　　Specification of Letters Patent.　　Patented Nov. 7, 1911.

Application filed December 12, 1910. Serial No. 596,874.

*To all whom it may concern:*

Be it known that I, DAVID NEWTON JONES, a citizen of the United States, residing at Gaylord, in the county of Sibley and State of Minnesota, have invented certain new and useful Improvements in Tire-Protectors; and I do declare the following to be a full, clear, and exact description of the invention, such as will enable others skilled in the art to which it appertains to make and use the same.

This invention relates to improvements in protectors for pneumatic tires.

One object of the invention is to provide an armor or protector for pneumatic tires which will protect the tire from all injury without interfering with the resiliency of the tire or the normal expansion of the same when inflated.

Another object is to provide a protector having means whereby the wheel will be prevented from skidding or slipping when passing over muddy or slippery roads, and which will be strong, durable and inexpensive in construction, light in weight, noiseless in operation and is not unsightly in appearance.

With these and other objects in view, the invention consists of certain novel features of construction, combination and arrangement of parts as will be more fully described and particularly pointed out in the appended claim.

In the accompanying drawings: Figure 1 is a side view of a portion of a wheel and tire showing my improved protector applied thereto, parts of the latter being shown in section; Fig. 2 is a cross sectional view thereof on the line 2—2 of Fig. 1; Fig. 3 is a detail sectional view on the line 3—3 of Fig. 1 showing the manner in which the sections of the protector are fastened together; Fig. 4 is a perspective view of one of the sections; Fig. 5 is a sectional view of the rolled steel plate from which the protector sections are formed.

Referring more particularly to the drawings, 1 denotes my improved protector which is formed of a series of sections 2 loosely connected together along the opposite sides of the tire whereby the resiliency of the latter is preserved. The sections 2 are each formed from metal plates which are increased in thickness midway between their ends or at the tread portion of the same.

The plates forming the sections are bent or curved transversely to conform to the curvature of the outer surface of the tire when in an inflated condition. The opposite ends 3 of the curved plates are reduced and offset to a slight extent as shown at 4 and in said ends are formed rectangular apertures 5. On the opposite side edges of the plates are formed rightangular outwardly projecting flanges 6 the outer edges 7 of which are substantially flat or square and at their central portion are flush with the outer surface of the thickened central portion of the plates as shown. The opposite or outer end edges 8 of the flanges are formed at right angles to the outer edges 7 whereby said flanges form square corners on the opposite sides of the tread portion of the sections, said square corners forming mud lugs and anti-slipping and skidding members which when the wheels are passing over soft muddy roads, sink into the mud and thus prevent the wheel from slipping around. The square outer corners of the flanges are preferably rounded or cut off at an angle as shown at 9. The plates forming the sections are slightly tapered or decrease in width from the center toward their opposite ends thus compensating for the difference between the diameter of the tire at its tread portion and the side portions of the same so that the flanged edges of the sections will fit closely together when the sections are arranged on the tire. The sections are loosely connected together at their outer ends and around the opposite sides of the tire by short links or connecting plates 10 said plates having on their opposite ends hook shaped lugs 11 which are engaged with the apertures 5 in the reduced ends 3 of the plates as shown. By thus connecting the sections together the protector will be held in position on the tire and will not interfere with the yielding or cushioning qualities thereof. The protector when thus constructed may be readily removed from the tire by simply bending back the lugs 11 on one end of the links on opposite sides of the tire thus permitting the separation and removal of the tire which may be quickly replaced and the lugs again bent back into engagement with the apertured ends of the sections. The sections are each complete in itself and may be sold separate and detached as articles of commerce and manufacture, all ready to be applied to the tire as before described. The hook plates may also be sold, with one end hook shaped complete and the.

other either standing out at a right angle to the main body, or unbent, ready for use in connecting adjacent sections.

From the foregoing description, taken in connection with the accompanying drawings, the construction and operation of the invention will be readily understood without requiring a more extended explanation.

Having thus described my invention what I claim is:—

A tire protector comprising a series of metal plates each curved transversely to fit the tire and graduated in thickness from the tread to the sides, square edged flanges on either side of said plate normal thereto, said flanges having straight outer edges flush with the outer surface of the plate at its central portion, perforated ears depending from the sides of the plate and offset outwardly therefrom and flat links hooked in the perforations of the plates to connect the same, said links lying between the ears and the tire.

In testimony whereof I have hereunto set my hand in presence of two subscribing witnesses.

DAVID NEWTON JONES.

Witnesses:
J. C. DETERLING,
R. H. WERGES.